(12) United States Patent
Galehr et al.

(10) Patent No.: US 10,137,924 B2
(45) Date of Patent: Nov. 27, 2018

(54) ADJUSTABLE STEERING COLUMN HAVING IMPROVED RIGIDITY

(71) Applicants: THYSSENKRUPP PRESTA AG, Eschen (LI); thyssenkrupp AG, Essen (DE)

(72) Inventors: Robert Galehr, Schaanwald (LI); Hieronymus Schnitzer, Gamprin (LI); Michael Scholten, Blons (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/556,537

(22) PCT Filed: Feb. 12, 2016

(86) PCT No.: PCT/EP2016/052953
§ 371 (c)(1),
(2) Date: Sep. 7, 2017

(87) PCT Pub. No.: WO2016/142119
PCT Pub. Date: Sep. 15, 2016

(65) Prior Publication Data
US 2018/0050718 A1    Feb. 22, 2018

(30) Foreign Application Priority Data

Mar. 9, 2015 (DE) .................. 10 2015 002 889

(51) Int. Cl.
*B62D 1/184* (2006.01)
*B62D 1/185* (2006.01)
(52) U.S. Cl.
CPC .............. *B62D 1/184* (2013.01); *B62D 1/185* (2013.01)

(58) Field of Classification Search
CPC ................................. B62D 1/184; B62D 1/185
See application file for complete search history.

(56) References Cited

U.S. PATENT DOCUMENTS 7,174,803 B2 * 2/2007 Reiche .................. B62D 1/185
                                                        280/775
7,322,607 B2 * 1/2008 Yamada .................. B62D 1/16
                                                        280/755

(Continued)

FOREIGN PATENT DOCUMENTS

DE    102008005256 A    8/2009
DE    102011056674 B    12/2012
(Continued)

OTHER PUBLICATIONS

English machine translation of International Search Report issued in PCT/EP2016/052953 dated Apr. 12, 2016 (dated Apr. 19, 2016).

*Primary Examiner* — Faye M Fleming
(74) *Attorney, Agent, or Firm* — Thyssenkrupp North America, Inc.

(57) ABSTRACT

A steering column arrangement for a motor vehicle may include a guide part for rotatably mounting a steering shaft about a longitudinal axis, a guide box that is mountable on the motor vehicle and in which the guide part is arranged displaceably along the longitudinal axis, and a clamping system that is for locking the guide part in the guide box and that is switchable between a locked state where the guide part is secured relative to the guide box and a released state where the guide part is displaceable relative to the guide box in a direction of the longitudinal axis, and first and second contact surfaces disposed between the guide box and the guide part. In the released state the first contact surface is in first frictional contact with a surface of the guide part that opposes a displacement of the guide part along the longitudinal axis relative to the guide box. In the locked state the (Continued)

second contact surface is in second frictional contact with a surface of the guide part wherein a frictional force designed as a holding force acts between the guide box and the guide part.

13 Claims, 4 Drawing Sheets

(56) References Cited

U.S. PATENT DOCUMENTS

| | | | | |
|---|---|---|---|---|
| 8,899,622 B2* | 12/2014 | Read | ............... | B62D 1/181 280/775 |
| 8,955,407 B2* | 2/2015 | Sakuma | ............... | B62D 1/185 280/777 |
| 2005/0173914 A1 | 8/2005 | Sadakata | | |
| 2006/0117898 A1 | 6/2006 | Schneider | | |
| 2010/0307280 A1 | 12/2010 | Schnitzer | | |
| 2012/0006141 A1 | 1/2012 | Stauffer | | |
| 2013/0074639 A1 | 3/2013 | Toyoda | | |
| 2013/0160594 A1 | 6/2013 | Tinnin | | |
| 2014/0137694 A1 | 5/2014 | Sugiura | | |
| 2014/0252753 A1 | 9/2014 | Schnitzer | | |
| 2014/0284910 A1 | 9/2014 | Schnitzer | | |
| 2015/0135882 A1 | 5/2015 | Rauber | | |
| 2017/0261028 A1* | 9/2017 | Wilkes | ............... | B62D 1/185 |
| 2017/0369091 A1* | 12/2017 | Nash | ............... | B62D 1/181 |
| 2018/0093697 A1* | 4/2018 | Forte | ............... | B62D 1/195 |
| 2018/0251147 A1* | 9/2018 | Heitz | ............... | B62D 1/181 |

FOREIGN PATENT DOCUMENTS

| | | |
|---|---|---|
| DE | 102011054606 B | 2/2013 |
| DE | 102012222295 A | 6/2013 |
| DE | 102012104644 B | 8/2013 |
| EP | 1125820 A | 8/2001 |
| WO | 2012027762 A | 3/2012 |

\* cited by examiner

ADJUSTABLE STEERING COLUMN HAVING IMPROVED RIGIDITY

CROSS REFERENCE TO RELATED APPLICATIONS

This application is a U.S. National Stage Entry of International Patent Application Serial Number PCT/EP2016/052953, filed Feb. 12, 2016, which claims priority to German Patent Application No. DE 10 2015 002 889.8 filed Mar. 9, 2015, the entire contents of both of which are incorporated herein by reference.

FIELD

The present disclosure generally relates to steering columns, including steering columns for motor vehicles that have improved rigidity.

BACKGROUND

In the prior art, steering columns for motor vehicles are known which are adjustable in order to be able to adapt the position of the steering wheel to the requirements of various drivers. For the axial adjustability of the steering column, EP 1 125 820 A2, for example, is known, in which two concentric tubes designed as guide box and guide part can essentially be moved into one another in the manner of a telescope. A bearing ensuring axial movability is arranged between the two tubes. DE 10 2011 056 674 B3 discloses a steering column arrangement in which the guide part and the guide box each have beads with which they are mounted in a manner guidable into one another along a longitudinal axis. The beads each have an elongated hole as feedthrough opening, through which a clamping bolt of a clamping system can be fed.

It is desirable that the axial adjustment of the steering column can easily be performed by a driver and that the friction between the guide box and the guide part is as low as possible. In case of a fixed or locked steering column, it is however advantageous if the friction between the guide box and the guide part is high in order to ensure a secure hold. The holding force and the displacement force of the steering column thus impose different requirements on the friction between the components.

From the prior art is known a series of technical solutions which influence the sliding friction between the guide box and the guide part.

US 2006/0117898 A1 discloses a steering column, on the inner jacket surface of which is arranged a sleeve, into the opening of which is injected a filler material in order to support the inner jacket surface.

DE 10 2008 005 256 A1 furthermore discloses a steering column having an inner and outer jacket tube, between which is arranged a plastic sleeve. The plastic sleeve has projections which engage with recesses of the outer jacket surface.

From WO 2012/027762 A1 is known a steering column with a wedge-shaped body, which is pressed against a guide part by means of an elastic pre-loading element.

None of the steering columns known from the prior art has a positive influence on the displacement force or the holding force.

Thus a need exists for a steering column arrangement for a motor vehicle, which steering column arrangement is easily adjustable in a non-locked state and has a high rigidity in a locked state.

DETAILED DESCRIPTION

Figure 1:
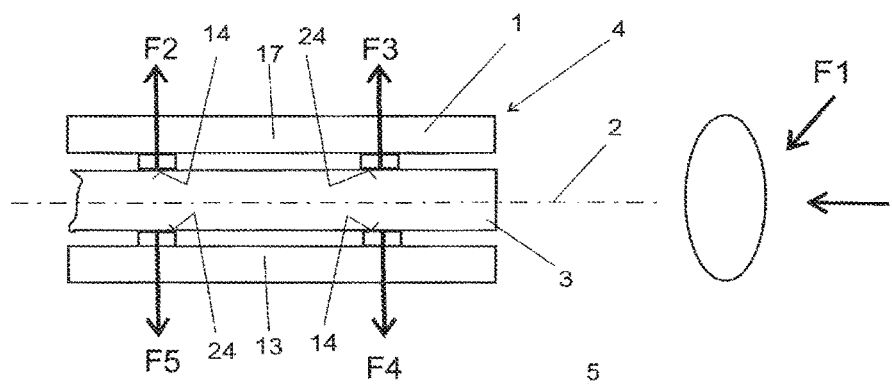
FIG. 1 is a schematic view of a force effect between an example guide part and an example guide box of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Because the steering column arrangement for a motor vehicle is provided with a guide part for the rotatable mounting of a steering shaft about a longitudinal axis, with a guide box which can be mounted on the motor vehicle and in which the guide part is arranged displaceably along the longitudinal axis, with a clamping system which is designed for locking the guide part in the guide box and can be switched over between a locked state of the steering column arrangement, in which the guide part is secured in its position in relation to the guide box, and a released state of the steering column arrangement, in which the guide part is displaceable in relation to the guide box in the direction of the longitudinal axis, wherein at least two contact surfaces are provided according to the invention between the guide box and the guide part, wherein, in the released state of the steering column arrangement, at least one first contact surface is in first frictional contact with a surface of the guide part, which surface opposes a displacement of the guide part along the longitudinal axis in relation to the guide box, and wherein, in the locked state of the steering column arrangement, at least one second contact surface is in second frictional contact with a surface of the guide part, wherein a frictional force which is designed as a holding force acts between the guide box and the guide part in the locked state of the clamping system, and wherein a first coefficient of sliding friction of the first frictional contact of the at least one first contact surface is smaller than a second coefficient of sliding friction of the second frictional contact of the at least one second contact surface, a very good displaceability of the guide part in relation to the guide box is ensured in the released state of the steering column arrangement, while a high rigidity is achieved in the locked state.

In a preferred embodiment, the difference between the second coefficient of sliding friction and the first coefficient of sliding friction is greater than 0.04. Furthermore preferably, the difference between the second coefficient of sliding friction and the first coefficient of sliding friction is greater than 0.07. In this respect, it is particularly preferred if the difference between the second coefficient of sliding friction and the first coefficient of sliding friction is greater than 0.10. Advantageously, the difference between the second coefficient of sliding friction and the first coefficient of sliding friction is greater than 0.13.

In this respect, it is to be preferred if the difference of the coefficients of sliding friction is less than or equal to 0.2.

The difference between the second coefficient of sliding friction and the first coefficient of sliding friction is preferably in a range between 0.04 and 0.2

In an advantageous embodiment, the guide box has at least one recess for accommodating an intermediate element, wherein the intermediate element forms the at least one first contact surface and/or the at least one second contact surface on an inner surface of the guide box. The recess is preferably a feedthrough opening.

It can furthermore be advantageously provided that the at least one first contact surface and/or the at least one second contact surface is formed by an anti-friction coating of the guide box on an inner surface. For this purpose, an anti-friction lacquer can, for example, be used.

In a preferred embodiment, at least one first contact surface is arranged, lying in a region of a lower surface of the guide box, in an end region of the guide box between a steering wheel-side end and the clamping system. Furthermore preferably, at least one second contact surface is arranged, lying in a region of an upper surface of the guide box, in an end region of the guide box between a steering wheel-side end and the clamping system. Advantageously, at least one first contact surface is arranged, lying on a side of the clamping system away from the steering wheel, in a region of an upper surface of the guide box. Furthermore preferably, at least one second contact surface is arranged, lying on a side of the clamping system away from the steering wheel, in a region of a lower surface of the guide box.

The steering column arrangement can preferably be formed by an inner jacket tube and by an outer jacket tube or by a guide part with at least one guide part bead and a guide box with at least one guide box bead engaging with the at least one guide part bead, which guide box bead allows a guiding of the guide part along the longitudinal axis in the guide box, and wherein the at least one guide part bead and the at least one guide box bead are provided with a feedthrough opening for feeding through a clamping bolt of the clamping system.

Particularly preferably, the steering column arrangement according to the invention comprises a console part which is designed for mounting the guide box on a body of the motor vehicle. In this way, an adjustability in a height direction or in a swivel direction can also be easily realized in addition to the adjustability in the direction of the longitudinal axis of the steering column arrangement.

FIG. 1 schematically shows which frictional forces act between a guide box 1 and a guide part 3 mounted therein displaceably along a longitudinal axis 2 during the adjustment of the steering column 4 and in the event of a crash or in the locked state of the steering column 4. A displacement force F1 is applied by a driver to the steering wheel in order to adjust the steering column 4 along the longitudinal axis 2 in the non-locked state of the steering column 4. The displacement force F1 acts at an acute angle to the longitudinal axis 2. An angle of approximately 45 degrees is shown here by way of example. The displacement force F1 produces two opposite forces F4 and F2, which act orthogonally to the longitudinal axis 2 and which press the guide part 3 against the guide box 1 at the contact surfaces 14. In the event of a crash or in the locked state of the steering column 4, the opposite frictional forces F3 and F5 act orthogonally to the longitudinal axis 2 at the contact surfaces 24.

Figure 2:
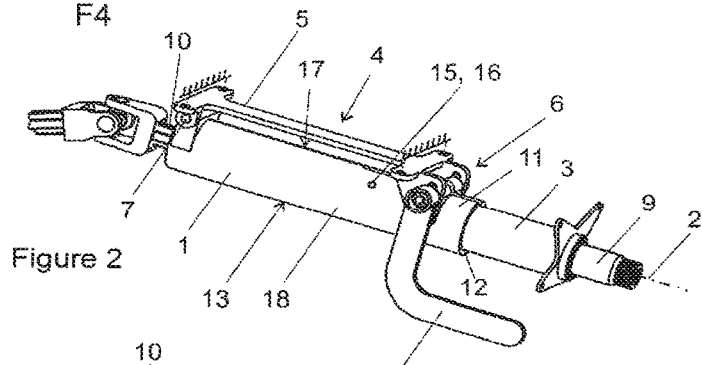
FIG. 2 is a spatial view of an example steering column arrangement having an inner and an outer jacket tube.
Figure 3:
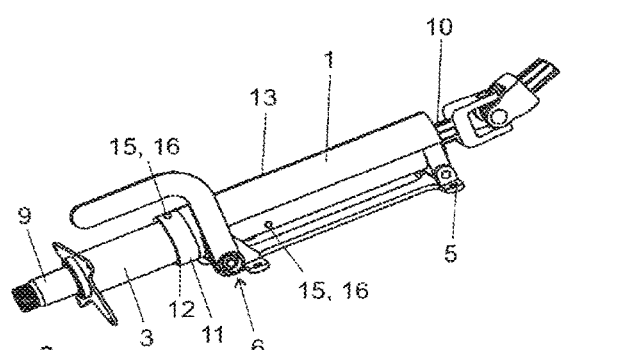
FIG. 3 is another spatial view of the example steering column of FIG. 2.
Figure 4:
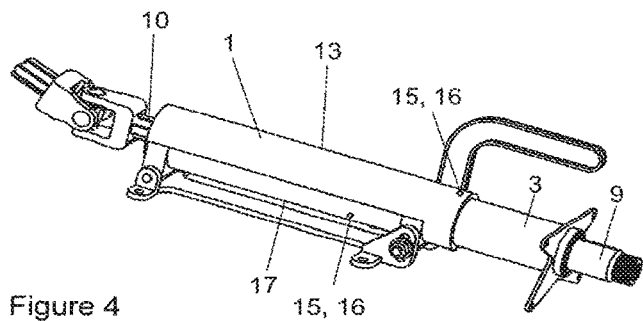
FIG. 4 is still another spatial view of the example steering column arrangement of FIG. 2.
Figure 5:
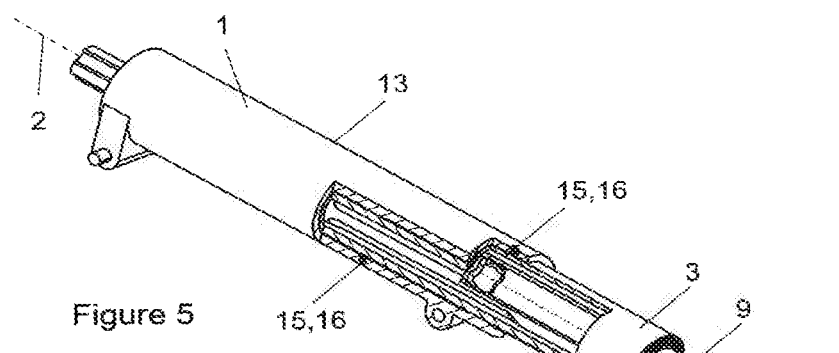
FIG. 5 is a spatial view of partially-cut jacket tubes with an intermediate element of the steering column arrangement of FIG. 2.

FIGS. 2 through 4 show a perspective view of a steering column arrangement 4 for a motor vehicle with a console 5 for firm mounting on the body. FIGS. 5 through 13 show different details of this steering column arrangement 4. The console 5 comprises a clamping system 6 for holding the guide box 1, and a swivel bearing 7 in which the guide part 3 is mounted. The guide box 1 and the guide part 3 are arranged concentrically to one another with a common central axis, which coincides with the longitudinal axis 2 of the steering shaft. The guide box 1 and the guide part 3 are designed to be substantially tube-shaped. In this arrangement, they are also called an outer jacket tube 1 and an inner jacket tube 3. An adjustment lever 8 serves to operate the clamping system 6. The steering shaft 9 or a steering control shaft 10 connected to the steering shaft is mounted rotatably inside the inner jacket tube 3. In an end region 11 of the outer jacket tube 1 between a steering wheel-side end 12 and the clamping system 6, a first contact surface 14 is provided on a lower surface 13 facing away from the console 5, of the outer jacket tube 1. The one first contact surface 14 is formed by an intermediate element 15, which is arranged in a first feedthrough opening 16 of the outer jacket tube 1. The first contact surface 14 lies on the inner surface of the outer jacket tube 1. Two additional first contact surfaces 14 are arranged symmetrically with respect to the longitudinal axis 2 on a side 18 of the clamping system 6 away from the steering wheel on an upper surface 17 arranged between the longitudinal axis 2 and the console 5, of the outer jacket tube 1. These two additional first contact surfaces 14 are also formed in a feedthrough opening 16 in the outer jacket tube 1 and an intermediate element 15 arranged therein. In the opened state of the steering column arrangement 4, the first contact surfaces 14 are in contact with the outer surface of the guide part 3 and thus lie in the force flow of the displacement force F1 and the resulting forces F2 and F4 and therefore preferably have a low friction.

Figure 6:
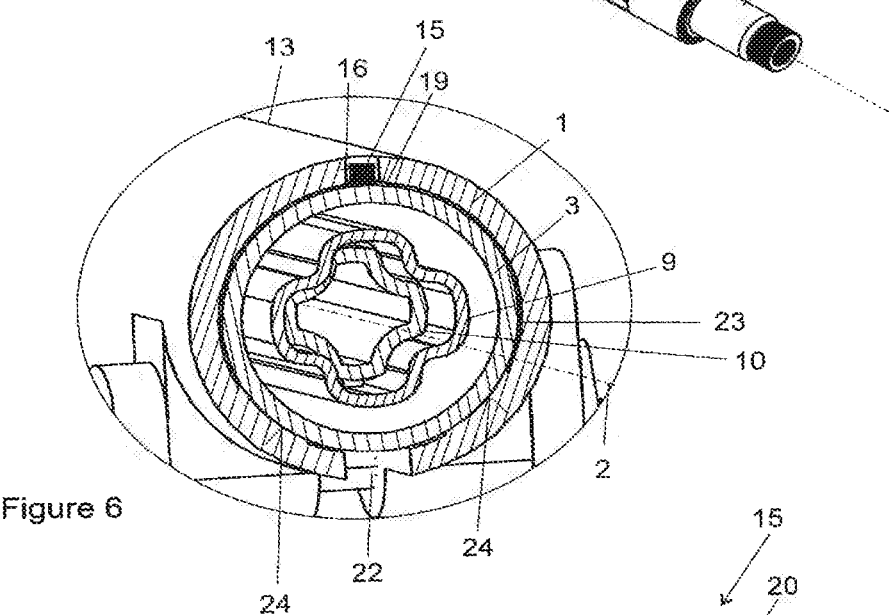
FIG. 6 is a cross-sectional view of the example guide part of the steering column arrangement of FIG. 2 and the example guide box in a region between a clamping system and a steering wheel-side end.
Figure 7:
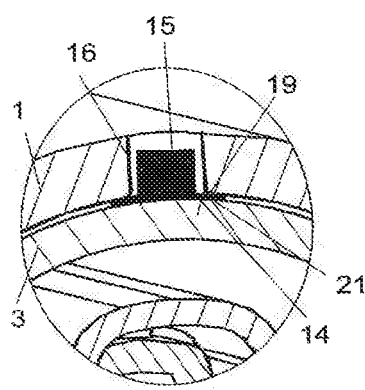
FIG. 7 is a detail view of an intermediate element of FIG. 6 disposed between the guide part and the guide box.

The arrangement and design of the intermediate elements 15 is shown in detail in FIGS. 5 through 9. The intermediate elements 15 are designed to be cylindrical with a collar 19 arranged at the end. The size of the cylinder is adapted to the feedthrough openings 16. In the installed state, the cylindrical region 20 of the intermediate element 15 is accommodated in the feedthrough opening 16 and the collar 19 is positioned between the guide box 1 and the guide part 3. The side 21 of the collar 19 away from the cylinder forms the contact surface 14. As can be seen in FIG. 6, the feedthrough opening 16 arranged on the lower surface 13 is arranged on the opposite side of a section 22 of the guide box 1, said section extending in the longitudinal direction from the steering wheel-side end. The section 22, which is designed as a slot in the example, is part of the clamping system 6. The collar 19 extends between the guide part 3 and the guide box 1 and in the example extends mirror-symmetrically in the circumferential direction. In a preferred embodiment, the first contact surfaces 14 are provided with an anti-friction coating. In another preferred embodiment, the first contact surfaces are formed by an anti-friction coating of the guide box on the inner surface 23.

In the example, two second contact surfaces 24 are each arranged lying, respectively, on one side in the circumferential direction next to the section 22, on the opposite side of the one first contact surface 14 on the upper surface 17 of the guide box 1. In the locked state of the steering column arrangement 4, these second contact surfaces 24 are in contact with the outer surface of the guide part 3 and thus lie in the force flow of the holding force F3, F5 and have a high friction when in contact. In one embodiment, these second contact surfaces 24 can be formed by a coating on an inner surface 23 of the guide box 1.

Figure 8:
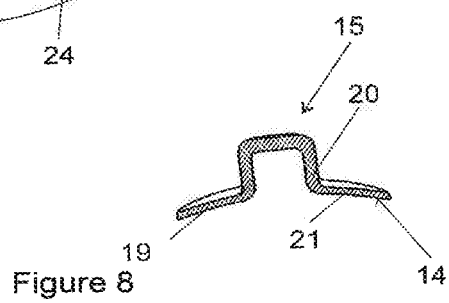
FIG. 8 is a spatial view of an example intermediate element.
Figure 9:
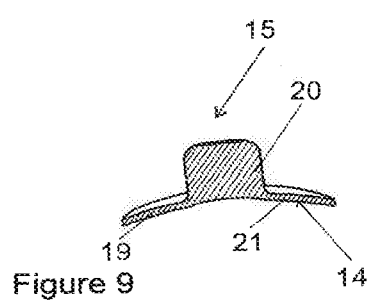
FIG. 9 is a spatial view of another example intermediate element.

The intermediate element 15 can be designed as a hollow cylinder closed on one side as shown in FIG. 8 or as a solid cylinder as shown in FIG. 9. The collar 19 is preferably shaped circularly and has a diameter that is significantly greater than the diameter of the feedthrough openings 16. The intermediate element 15 can be produced from foil, sheet metal, or plastic. The intermediate element 15 is preferably produced from plastic in an injection molding process.

FIGS. 10 through 13 illustrate advantageous arrangements of the first and second contact surfaces 14, 24 on the inner surface 23 of a guide box 1 for the steering column arrangement according to FIG. 1.

Figure 10:
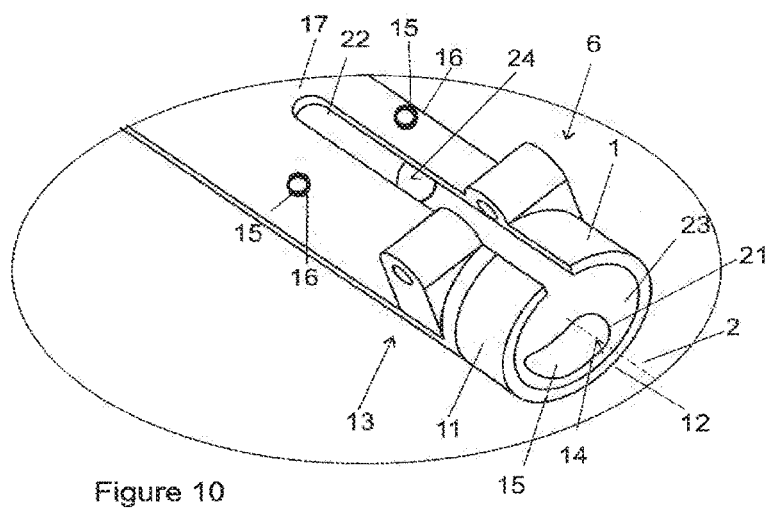
FIG. 10 is a perspective view of an example guide box with several contact surfaces according to FIG. 2.
Figure 11:
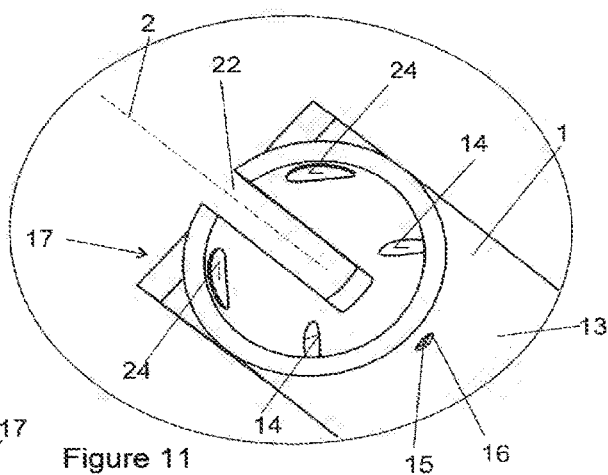
FIG. 11 is a perspective view of the guide box of FIG. 10.
Figure 12:
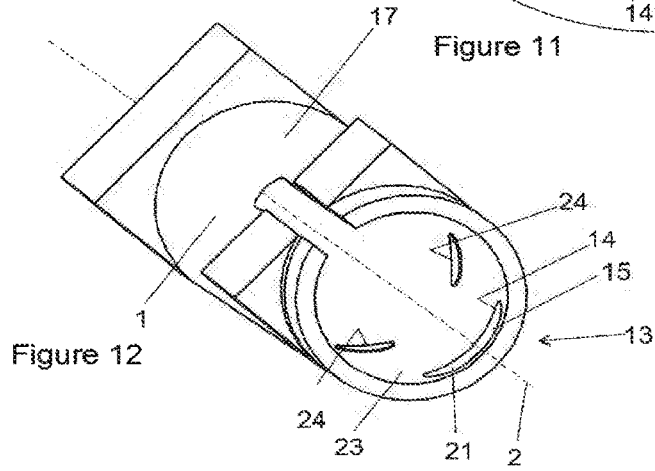
FIG. 12 is another perspective view of the guide box of FIG. 10.
Figure 13:
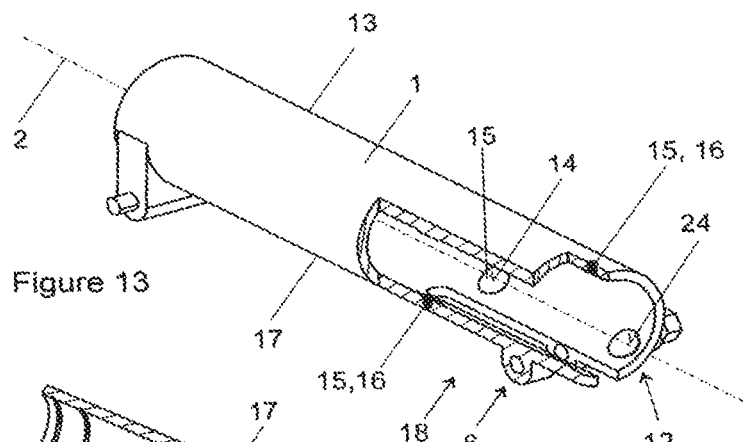
FIG. 13 is a spatial view of the partially-cut guide box of FIG. 10.
Figure 14:
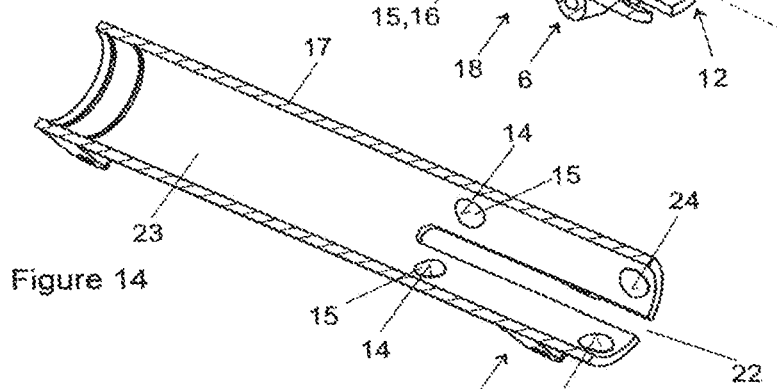
FIG. 14 is a spatial cutaway view of a first half of a guide box analogous to the example of FIG. 2.

FIG. 10 shows a guide box 1 in a view onto the upper surface 17. The first contact surface 14 is provided in the end region 11 of the guide box on the lower surface 13 facing away from the console 5, of the guide box 1. This first contact surface 14 is formed from the intermediate element 15 arranged in the feedthrough opening 16 of the guide box 1 and has a low friction. On the opposite side, the two second contact surfaces 24 are arranged on the inner surface 23 of the guide box 1 (see FIG. 11) and have a high friction. The two additional first contact surfaces 14 are each arranged lying, respectively, on a side of the section 22 of the guide box 1 in the circumferential direction, on the upper surface 17 of the guide box 1 close to the console on the side of the clamping system 6 away from the steering wheel. These two first contact surfaces 14 are, as already described, respectively formed by an intermediate element 15 engaging with a feedthrough opening 16 and have a low friction. Opposite these two first contact surfaces 14, two additional second contact surfaces 24 are arranged as shown in FIG. 12. These paired second contact surfaces 24 are arranged symmetrically with respect to the longitudinal axis 2 on the inner surface 23 of the guide box 1 in the region of the lower surface 13 and have a high friction. The high friction can be generated by a coating on the inner surface 23 of the guide box 1.

Figure 15:
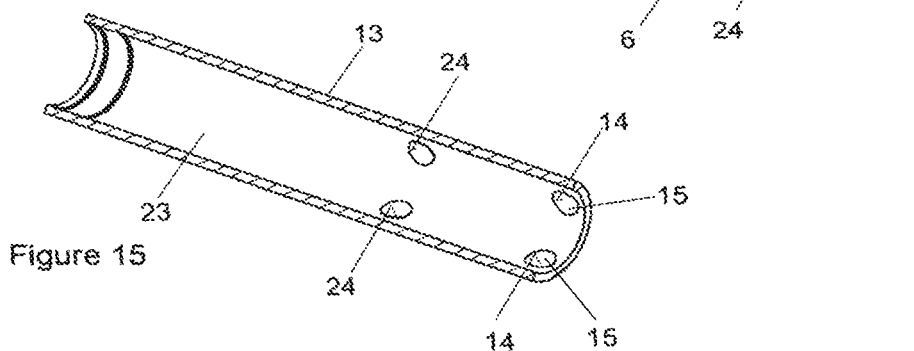
FIG. 15 is a spatial cutaway view of a second half of the guide box of FIG. 14.
Figure 16:
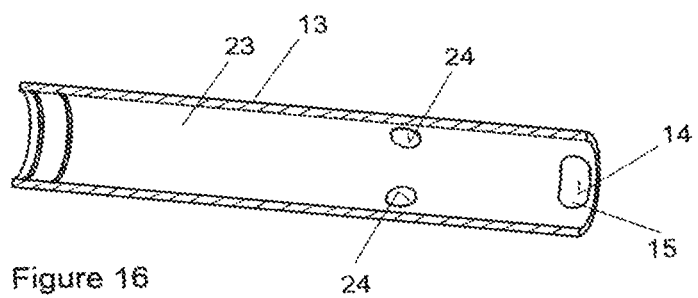
FIG. 16 is a spatial cutaway view of a second half of another example guide box analogous to the example of FIG. 15.

FIG. 15 shows an alternative arrangement of the contact surfaces on the inner surface 23 of the guide box 1 in the region of the lower surface 13. The first contact surface 14 is arranged in pairs with an additional first contact surface 14, which is also formed by an intermediate element 15 with low friction. The two first contact surfaces 14 have a low friction and are in this case arranged symmetrically with respect to the longitudinal axis 2 and parallel to the two second contact surfaces 24, which generate a high friction. In another preferred embodiment of the invention, the first contact surfaces 14 are formed by an anti-friction coating and provided with an anti-friction coating in another preferred embodiment.

It is also conceivable and possible to form the second contact surfaces 24 by a coating or to provide them with a coating.

In another embodiment of the invention, more than two first contact surfaces 14 and/or more than two second contact surfaces 24 are formed on the inner surface 23 of the guide box 1 in the region of the lower surface 13.

In another preferred embodiment of the invention, more than two first contact surfaces 14 and/or more than two second contact surfaces 24 are formed on the inner surface 23 of the upper surface 17.

It applies to all exemplary embodiments mentioned that the first contact surfaces 14 are in contact with the outer upper surface of the guide part 3 in the opened state of the steering column arrangement 4 and thus are arranged in the force flow of the displacement force F1, F2, F4 and that the second contact surfaces 24 are in contact with the outer upper surface of the guide part 3 in the locked state of the steering column arrangement 4 and are arranged lying in the force flow of the holding force F3, F5. The different friction on the contact surfaces is determined by the difference of their coefficients of sliding friction. The coefficient of sliding friction is in this case a measure for the sliding frictional force in relation to the contact force between two bodies. The first contact surfaces 14 have coefficients of sliding friction that are smaller than the coefficients of sliding friction of the second contact surfaces 24. Preferably, the first contact surfaces 14 have a first coefficient of sliding friction and the second contact surfaces 24 have a second coefficient of sliding friction, wherein the first coefficient of sliding friction is smaller than the second coefficient of sliding friction.

The sliding friction difference is produced by the surface structure and/or the coating and/or by means of an intermediate element. The guide box 1 is preferably produced from a single material. The sliding friction difference can also be produced via lubricants, such as grease, oil, wax, or the like. The difference between the second coefficient of sliding friction and the first coefficient of sliding friction is preferably greater than 0.04.

Alternative exemplary embodiments of the invention can also comprise non-round jacket tubes in deviation of the embodiment described. For example, the invention can thus also be applied in the case of jacket tubes, in which the surfaces have one or more corresponding small flat portions in order to form an anti-rotation device. Other polygonal or elliptical or other non-round shapes are however also conceivable and possible.

The invention can also be applied to steering column arrangements with a guide part 3 and a guide box 1 surrounding the guide part 3 only partially in the circumferential direction, wherein the two components each have beads, with which they are mounted in a manner guidable into one another along a longitudinal axis. Such a steering column arrangement is, for example, known from DE 10 2011 054 606 B3.

The steering column arrangement according to the invention is easily adjustable by the special arrangement of the different contact surfaces between the guide box and the guide part in a non-locked state and at the same time has a high rigidity in a locked state.

To the extent that they are usable, all individual features of the invention can be combined with one another without leaving the scope of the invention.

What is claimed is:

1. A steering column arrangement for a motor vehicle comprising:
    a guide part for rotatably mounting a steering shaft about a longitudinal axis;
    a guide box that is mountable on the motor vehicle, the guide part being positioned displaceably in the guide box along the longitudinal axis;
    a clamping system for locking the guide part in the guide box, the clamping system switchable between a locked state in which the guide part is secured relative to the guide box and a released state in which the guide part is displaceable relative to the guide box in a direction of the longitudinal axis; and
    a first contact surface and a second contact surface disposed between the guide box and the guide part, wherein in the released state the first contact surface is in first frictional contact with a surface of the guide part that opposes a displacement of the guide part along the longitudinal axis relative to the guide box, wherein in the locked state the second contact surface is in second frictional contact with a surface of the guide part such that a frictional force that operates as a holding force acts between the guide box and the guide part, wherein a first coefficient of sliding friction of the first frictional contact of the first contact surface is smaller than a second coefficient of sliding friction of the second frictional contact of the second contact surface.

2. The steering column arrangement of claim 1 wherein a difference between the second coefficient of sliding friction and the first coefficient of sliding friction is greater than 0.04.

3. The steering column arrangement of claim 1 wherein a difference between the second coefficient of sliding friction and the first coefficient of sliding friction is greater than 0.13.

4. The steering column arrangement of claim 1 wherein a difference between the second coefficient of sliding friction and the first coefficient of sliding friction is less than or equal to 0.2.

5. The steering column arrangement of claim 1 wherein the guide box comprises a recess for accommodating an intermediate element, wherein the intermediate element includes at least one of the first contact surface or the second contact surface on an inner surface of the guide box.

6. The steering column arrangement of claim 1 wherein at least one of the first contact surface or the second contact surface is formed by an anti-friction coating on an inner surface of the guide box.

7. The steering column arrangement of claim 1 wherein the first contact surface is disposed, lying in a region of a lower surface of the guide box, in an end region of the guide box between a steering wheel-side end and the clamping system.

8. The steering column arrangement of claim 1 wherein the second contact surface is disposed, lying in a region of an upper surface of the guide box, in an end region of the guide box between a steering wheel-side end and the clamping system.

9. The steering column arrangement of claim 1 wherein the first contact surface is disposed, lying on a side of the clamping system away from a steering wheel, in a region of an upper surface of the guide box.

10. The steering column arrangement of claim 1 wherein the second contact surface is disposed, lying on a side of the clamping system away from a steering wheel, in a region of a lower surface of the guide box.

11. The steering column arrangement of claim 1 wherein the guide box is configured as an inner jacket tube and the guide part is configured as an outer jacket tube.

12. The steering column arrangement of claim 1 wherein the guide part includes a guide part bead and the guide box includes a guide box bead that engages with the guide part bead, wherein the guide box bead permits guiding of the guide part along the longitudinal axis in the guide box, wherein the guide part bead and the guide box include a feedthrough opening for feeding through a clamping bolt of the clamping system.

13. The steering column arrangement of claim 1 further comprising a console part that is configured to mount the guide box on a body of the motor vehicle.

* * * * *